Figure 1:
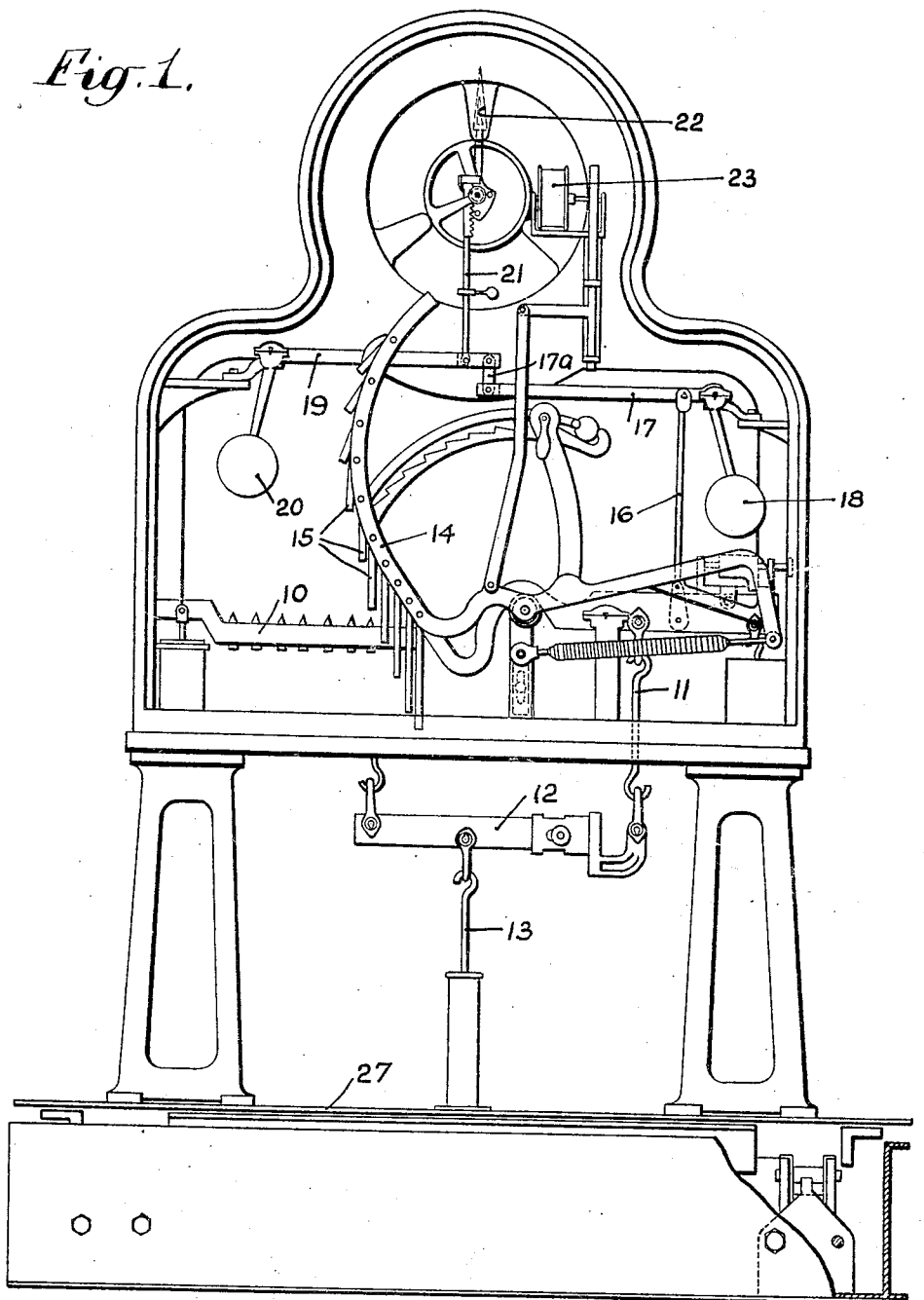

Jan. 10, 1928.

W. N. GILBERT 1,655,500

SCALE

Original Filed June 13, 1921

Patented Jan. 10, 1928.

1,655,500

UNITED STATES PATENT OFFICE.

WILLIAM NATHAN GILBERT, OF HUDSON HEIGHTS, NEW JERSEY, ASSIGNOR TO DAYTON SCALE COMPANY, OF DAYTON, OHIO, A CORPORATION OF NEW JERSEY.

SCALE.

Original application filed June 13, 1921, Serial No. 477,071. Divided and this application filed January 28, 1927. Serial No. 164,152.

This invention relates to improvements in scales and more particularly, is directed to improvements in load counterbalancing systems and indicator operating devices for weighing scales of the so-called automatic type.

The invention has for its object, the provision of a weighing mechanism which will properly counterbalance the load and compensate for tipping of the scale.

Further improvements consist in the provision of novel indicating operating means for weighing scales.

Other objects of invention will be hereinafter pointed out in the accompanying specification and claims, and shown in the drawings which by way of illustration show a preferred embodiment of the invention.

The present application is a division of my copending application Serial No. 477,071, filed June 13, 1921, for scales.

In the drawings

Figure 1 shows an elevational view of the weighing scale of my invention.

The general form of weighing scale is of the type well known in the art. It comprises a load supporting platform 27 supported upon base levers of any desired type or of the specific type shown in my co-pending application above referred to. The scale proper comprises the usual fulcrumed main scale beam 10, having a steelyard rod 11 pivotally connected thereto and pivotally connected to an intermediate lever 12 from which the usual shaft rod 13 extends to the nose iron of the base lever system (not shown). Associated with the scale beam there may be employed a counterbalanced weight carrier 14 which can be manually adjusted to apply one more capacity weights 15 upon the scale beam.

In order to automatically counterbalance the load and indicate the amount of load thus offset I provide a steelyard 16 which connects the main beam 10 with a laterally extending arm 17 of a pivoted pendulum 18. Adjacent substantially to the left hand end of the arm 17 there is provided a link 17ª which connects with a similar arm 19 extending from a pivoted pendulum 20. One of the arms 17 or 19 preferably the latter, has connected with it a rack rod 21 which through the usual pinion actuates the pivotal indicator 22. Upon the application of a load to the beam, the right hand end of the beam 10 moves downwardly thereby drawing down link 16 and swinging pendulum 18 upward to the right, concurrently pendulum 20 swings upward to the left and this action automatically counterbalances the applied load and displaces the pointer 22 to indicate the amount of the applied load upon the usual dial.

Loads in excess of the capacity of the automatic counterbalancing devices are offset by the capacity weights and the amount of the load thus offset is indicated by suitable capacity weight indicator 23.

As shown in the drawings, the operating connection 21 to the indicator is direct from one of the arms for example 19 and is removed from cooperation with link 17ª as heretofore. Furthermore, the connection 21 is disposed substantially upon the medium vertical line of the apparatus arms 17 and 19 are of equal effective length with respect to the distance between their pivot points and the connection with link 17ª. To maintain 21 substantially upon the center line and to keep arms 17 and 19 equal in their effective length the pivot mountings for the two pendulums are displaced to right a corresponding distance. Beam 10 so far as the automatic counterbalancing system is concerned is a third order lever and the steelyard connection 16 connects to 17 at a point between the pivotal support and link 17ª.

I claim:

1. A weighing scale comprising, in combination a main scale beam, a steelyard connected thereto to transmit the load to the beam, a pair of pendulums disposed above said beam and having interconnected extending arms, a pivotal indicator operating device operatively connected directly to one of the arms and separate from the interconnection of said arms, and connections from one of said arms to said beam.

2. A weighing scale comprising, in combination with a fulcrumed main scale beam, a load counterbalancing pendulum pivoted above the beam to one side of the fulcrum thereof, an extended arm for said pendulum, operating connections therefrom to said beam, a pivotal indicator, and a connection to said indicator from the aforesaid extended arm which is independent of the aforesaid operating connections to the beam.

3. A weighing scale load counterbalancing and indicator operating device, comprising a pair of pendulums each having extended arms, operatively interconnected with each other, and an indicator driving means directly operatively connected with one of the arms at a point spaced from the operating interconnection of that arm with the other arm.

4. A weighing scale load counterbalancing device comprising a pair of pivotally supported pendulums each having an extended arm, operating interconnections between said extended arms, and means for operating said pendulums, said means connected to one of the arms intermediate the pivotal support for the pendulum and the operating interconnection for the other arm.

5. A weighing scale load counterbalancing and indicator operating device comprising a pair of pivotally supported pendulums each having an extended arm, operating interconnections between said arms, means for operating the pendulum counterbalancing system comprising an operating member connected to one extended arm at a point intermediate the pivotal support of the pendulum and the operating interconnection to the other arm and an operating connection to the indicator from the other arm connected thereto at a point intermediate the pivotal support for the pendulum and the interconnection to the first mentioned arm.

6. A load counterbalancing and indicator operating means for a weighing scale comprising a pair of pivotally supported pendulums each having an extended arm extending towards each other, means operatively interconnecting the ends of the arms, means for operating the pendulums connected to one arm intermediate the pivotal support for the pendulums and the aforesaid interconnecting means, and means for operating the indicator connected likewise to one of the arms at a point between the pivotal support for the pendulum and the aforesaid operating interconnection.

7. A load counterbalancing and indicator operating device for a weighing scale comprising a pivotal indicator, an operating means therefor disposed substantially upon the vertical center line of the apparatus, a pair of pendulums each having extended interconnected arms of substantially equal effective length, and means connecting the indicator operating means to one of said arms and independent of the interconnection of the aforesaid arms.

In testimony whereof I hereto affix my signature.

WILLIAM NATHAN GILBERT.